United States Patent [19]
Murfree, Jr. et al.

[11] 3,757,520
[45] Sept. 11, 1973

[54] CATALYTIC GAS GENERATION USING A HYDRAZINE WITH AN OXIDIZER ON AN INERT SUBSTRATE

[75] Inventors: James A. Murfree, Jr., Huntsville; Billy J. Sandlin, Athens; William A. Duncan, Huntsville, all of Ala.

[73] Assignee: The United States of America as represented by the Secretary of the Army, Washington, D.C.

[22] Filed: July 5, 1967

[21] Appl. No.: 651,654

[52] U.S. Cl. .................................. 60/219, 149/36
[51] Int. Cl. ............................................ C06d 5/10
[58] Field of Search ............... 149/36; 60/219, 220, 60/218; 23/281

[56] References Cited
UNITED STATES PATENTS

| | | | |
|---|---|---|---|
| 2,925,709 | 2/1960 | Mantell et al. | 149/36 X |
| 2,930,184 | 3/1960 | Plescia et al. | 149/36 X |
| 3,021,667 | 2/1962 | Griffin et al. | 149/36 X |
| 3,083,527 | 4/1963 | Fox | 60/220 X |
| 3,086,945 | 4/1963 | Cohn | 149/36 X |
| 3,331,203 | 7/1967 | Kaufman et al. | 60/220 |

*Primary Examiner*—Benjamin R. Padgett
*Attorney*—Harry M. Saragovitz, Edward J. Kelly, Herbert Berl and Elihu L. Turetsky

[57] ABSTRACT

A gas generation scheme in which an inert porous support material, substrate or carrier, is heated sufficiently to maintain decomposition of a liquid monopropellant by a hypergolic or spontaneous exothermic reaction between the liquid monopropellant and a suitable oxidizing agent.

7 Claims, 4 Drawing Figures

PATENTED SEP 11 1973 3,757,520

James A. Murfree Jr.
Billy J. Sandlin
William A. Duncan,
INVENTORS.

BY Harry M. Saragovitz
Edward J. Kelly
Herbert Berl
Elihu L. Turetsky

CATALYTIC GAS GENERATION USING A HYDRAZINE WITH AN OXIDIZER ON AN INERT SUBSTRATE

BACKGROUND OF THE INVENTION

This invention relates to a gas generation scheme, and in particular to one employing a liquid monopropellant, an initiator and an inert porous support material which supports the initiator.

The development of reliable, useful monopropellant liquid gas generators for use in missiles is a pressing problem and the subject of much research. Much work has been done on the catalytic decomposition of hydrazine and similar fuels for gas generation. These schemes utilize an inert carrier supporting a nonreactive and non-consumed coating of an active catalytic agent which rapidly and spontaneously decomposes hydrazine into the gases nitrogen, hydrogen and ammonia. These catalytic decomposition schemes, thus, allow numerous restarts and make an on-off operation feasible since the catalyst is not consumed. However, the more active and better catalysts are expensive (greater than $1,000/lb.). Therefore, less expensive catalysts or the development of new decomposition schemes for monopropellants which meet the requirements for gas generation applications in missiles are very desirable.

SUMMARY OF THE INVENTION

It has been discovered that a gas generator can be provided by supporting certain oxidizing agents in certain inert porous solid support materials and bringing an exothermally decomposing monopropellant such as hydrazine into contact with the oxidizing agent. The monopropellant and oxidizing agent, when brought together, react to produce gas and heat. The thus heated support material causes decomposition of the liquid monopropellant. The inert porous support material not only serves to support the initiator but also serves as a decomposition bed maintaining a sufficient temperature to sustain the decomposition of the liquid monopropellant once the initiator has been consumed. By maintaining a sufficient temperature during the off phase so that when the propellant is readmitted, spontaneous decomposition recommences, an on-off operational capability is made possible.

BRIEF DESCRIPTION OF THE DRAWING

This invention and objects and advantages thereof will become more clearly understood by reference to the following detailed description, of which the accompanying drawing forms an integral part thereof, and in which.

DESCRIPTION OF THE PREFERRED EMBODIMENTS

An inert porous support material is employed to support certain oxidizing agents for use as initiators in gas generators incorporating exothermally decomposing liquid monopropellants. Monopropellants which have been satisfactorily used in this scheme of gas generation are hydrazine and hydrazine-type fuels (e.g., 1,1-dimethylhydrazine and monomethylhydrazine). Mixtures thereof may be particularly desirable in certain instances. Note, however, that almost any exothermally decomposing monopropellant may be used.

Initiators (oxidizing agents) which have been satisfactorily used are potassium permanganate, potassium dichromate, iodic acid, iodic anhydride and calcium permanganate. Other oxidizing agents and mixtures thereof may also be used as initiators, provided the oxidizing agent used reacts vigorously with the monopropellant. Note, however, that not every oxidizing agent will work with every exothermally decomposing monopropellant. In particular, potassium permanganate will not work with 1,1-dimethylhydrazine. With this exception, any of the five specific oxidizing agents given above will generally work with any exothermally decomposing monopropellant. Accordingly, the term suitable oxidizing agent is defined herein to mean an oxidizing agent that will react with the particular monopropellant chosen. Inert porous support materials for the initiator which have been satisfactorily employed are activated charcoal, silica gel, alumina, porous firebrick and similar refractory materials. The support material, thus, acts as a substrate or carrier for the initiator, and a porosity of from about 65% to about 85% has been satisfactorily employed.

There are numerous methods of utilizing the support or carrier in a bed for the decomposition. The support can be in the form of granules or pellets contained in a suitable housing, or it may be a single piece of the support material with sufficient porosity to allow passage of the liquid monopropellant and decomposition gases.

EXAMPLE 1

Figure 1:
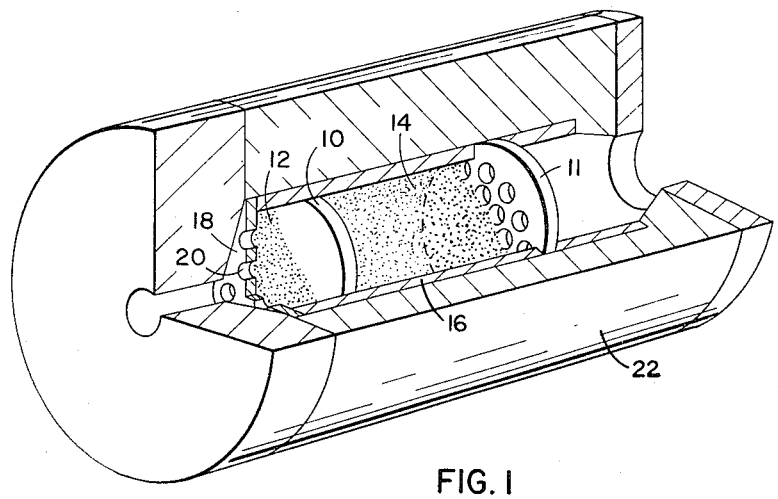
FIG. 1 is a perspective view, shown partially cut away, of a gas generating bed of this invention inside a gas generator housing.
Figure 2:
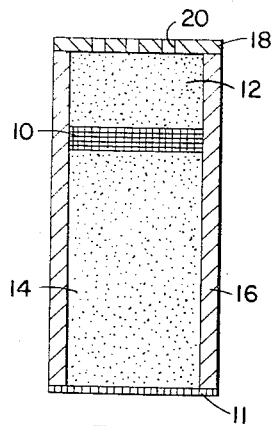
FIG. 2 is a cross-sectional view of the gas generating bed of FIG. 1.

A specific example of this invention is one which uses hydrazine as the liquid monopropellant, potassium permanganate as the initiator, and porous firebrick as the support and decomposition bed. FIGS. 1 and 2 show an arrangement for this example. A sandwich design is used; i.e., a layer of initiator 10 is placed between two layers of firebrick 12 and 14. The firebrick and initiator are enclosed in sleeve 16, and a pressurized injector (not shown) and injector plate 18 are used to inject the monopropellant through holes 20 into the firebrick and initiator. The firebrick layers 12 and 14 are secured to sleeve 16 by a refractory adhesive. Sleeve 16, which surrounds the firebrick, is enclosed in a gas generator housing 22 in a conventional manner. A wire retaining screen 11 (or other perforated support) is secured to the gas generator housing 22 in a conventional manner.

EXAMPLE 2

Figure 3:
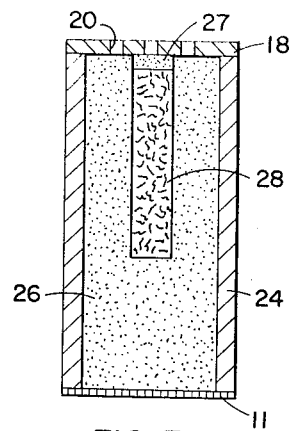
FIG. 3 is a cross-sectional view of an alternative embodiment of a gas generating bed of this invention; and, FIG. 4 is a cross-sectional view of another alternative embodiment of a gas generating bed of this invention.

Another example of this invention is one which uses monomethylhydrazine as a liquid monopropellant, calcium permanganate as the initiator, and porous firebrick as the support and decomposition bed. FIG. 3 shows an arrangement for this example. The gas generating bed of FIG. 3 is substituted for the bed of FIG. 2 and is used in the gas generator housing 22 of FIG. 1. A plug design is used; i.e., a plug 28 of the initiator is poured or inserted into a drilled hole (or holes) in the firebrick. The holes may be incorporated in a variety of designs or geometrical arrangements. Sleeve 24 surrounds firebrick 26 which is secured to sleeve 24 by a refractory adhesive. Injector plate 18 is utilized to inject the monopropellant through holes 20 into the firebrick and initiator. A thin firebrick stopper 27 caps initiator plug 28. A wire retaining screen 11 (or other perforated support) is secured to the gas generator housing 22 in a conventional manner.

EXAMPLE 3

Figure 4:
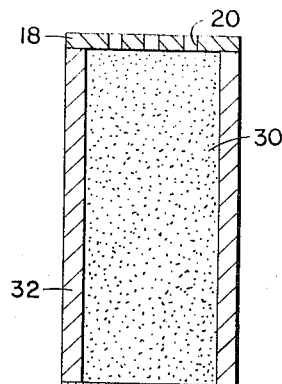

Still another example of this invention is one which uses 1,1-dimethylhydrazine as the liquid monopropellant, iodic acid dispersed in porous firebrick as the initiator, and porous firebrick as the support and decomposition bed. As illustrated in FIG. 4, the gas generating bed of which is substituted for the gas generating bed of FIG. 2 or FIG. 3 and adapted to be placed in the gas generator housing 22 of FIG. 1, porous firebrick support 30 is secured to sleeve 32 by a regractory adhesive. Injector plate 18 is utilized to inject the monopropellant through holes 20 into the firebrick with the initiator supported therein. A wire retaining screen 11 (or other perforated support) is secured to the gas generator housing 22 in a conventional manner.

The mode of operation of this invention is as follows: The initiator is put in or on the support or bed such that when the monopropellant is admitted to the bed, it reacts rapidly and vigorously with the initiator which is consumed in the reaction. The initial reaction also decomposes the monopropellant with resultant gas formation. The reaction between the monopropellant and initiator generates sufficient heat to bring the support up to a sufficient temperature to maintain the decomposition, with gas generation, of the monopropellant throughout the required operational time of the gas generator, even after the initiator has been consumed.

On-off operational capability is also possible since the support is maintained at a sufficient temperature for a few minutes during the off phase so that when the propellant is readmitted, spontaneous decomposition recommences.

Various other modifications and variations of this invention will be really apparent to those skilled in the art in the light of the above teachings which are within the spirit and scope of this invention.

We claim:

1. The process of gas generation comprising: providing an inert porous support material; supporting an inorganic oxidizing agent selected from potassium permanganate, potassium dichromate, iodic acid, iodic anhydride and calcium permanganate in said inert support material; and bringing an exothermally decomposing liquid monopropellant selected from hydrazine, 1,1-dimethylhydrazine, monomethylhydrazine and mixtures thereof into contact with said inert support material and said oxidizing agent to cause said liquid monopropellant and said oxidizing agent to react with the liberation of heat and gas and thereby heat said inert support material to a temperature sufficient to maintain decomposition of said liquid monopropellant after said oxidizing agent is expended.

2. The process of claim 1 wherein said liquid monopropellant is hydrazine, 1,1-dimethylhydrazine or monomethylyhdrazine.

3. The process of claim 1 wherein said inert porous support material is activated charcoal, silica gel, alumina or porous firebrick.

4. The process of claim 1 wherein said liquid monopropellant is hydrazine, 1,1-dimethylhydrazine or monomethylhydrazine and said inert porous support material is activated charcoal, silica gel, alumina or porous firebrick.

5. The process of claim 1 wherein said liquid monopropellant is hydrazine or monomethylhydrazine.

6. The process of claim 1 wherein said liquid monopropellant is hydrazine or monomethylhydrazine and said inert porous support material is activated charcoal, silica gel, alumina or porous firebrick.

7. The process of claim 1 wherein said liquid monopropellant is hydrazine, 1,1-dimethylhydrazine or monomethylhydrazine and said oxidizing agent is potassium dichromate, iodic acid, iodic anhydride or calcium permanganate.

* * * * *